UNITED STATES PATENT OFFICE.

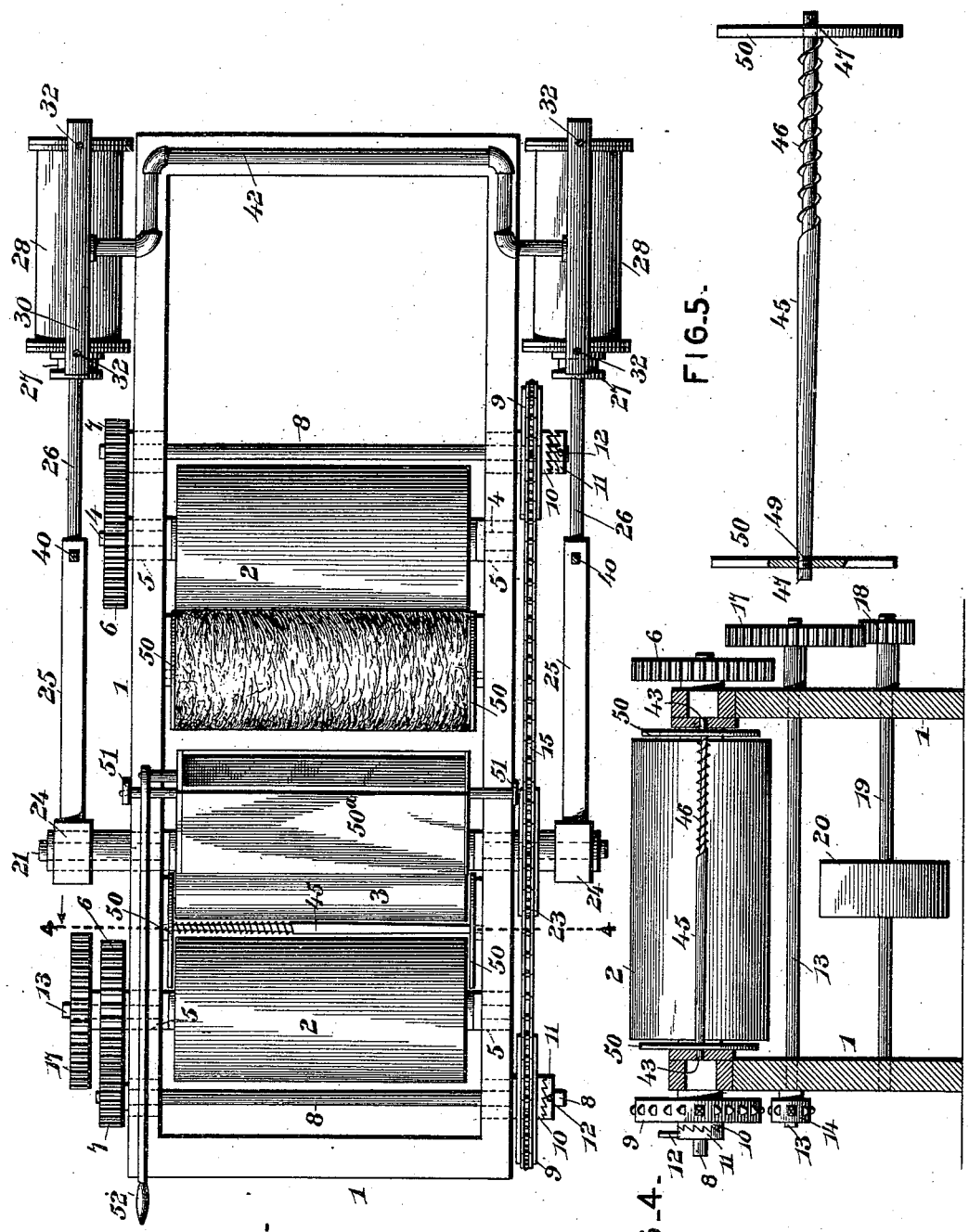

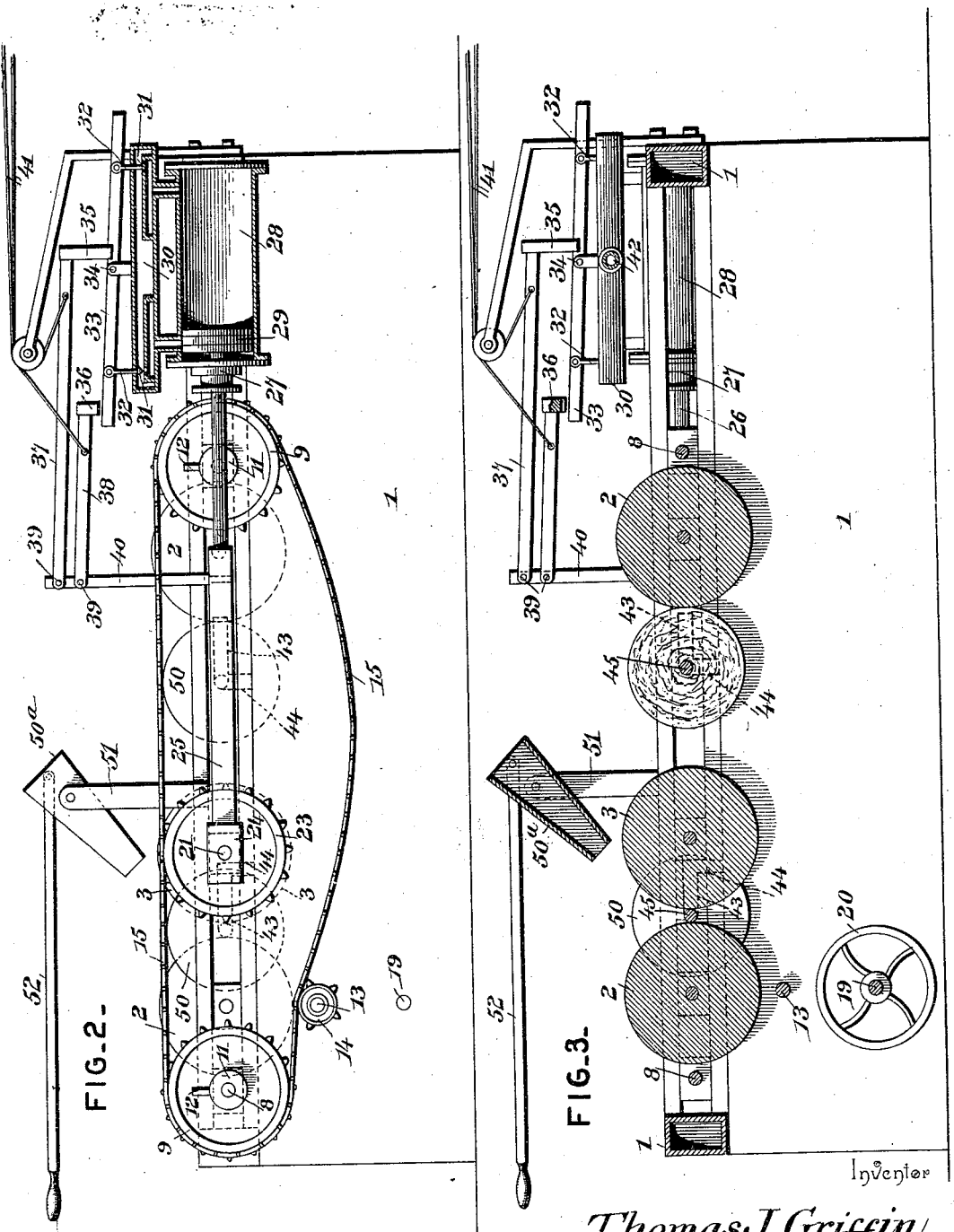

THOMAS J. GRIFFIN, OF GALVESTON, TEXAS, ASSIGNOR OF FOUR-FIFTHS TO H. RIEDEL, H. REMBERT, ED. McCARTHY, AND N. WEEKS, OF SAME PLACE.

COTTON-PRESS.

SPECIFICATION forming part of Letters Patent No. 562,180, dated June 16, 1896.

Application filed March 13, 1896. Serial No. 583,078. (No model.)

*To all whom it may concern:*

Be it known that I, THOMAS J. GRIFFIN, a citizen of the United States, residing at Galveston, in the county of Galveston and State of Texas, have invented a new and useful Cotton-Compress, of which the following is a specification.

This invention relates to cotton-compresses, and it has for its object to provide a new and useful roller-compress for making bales of cotton into a cylindrical or roll form, and also having simple and efficient mechanism for continuously forming a bale all the time the compress is in operation, which result has heretofore been impossible in presses of that character employing only one pair of compressing-rolls.

With these and other objects in view, which will readily appear as the nature of the invention is better understood, the same consists in the novel construction, combination, and arrangement of parts hereinafter more fully described, illustrated, and claimed.

In the drawings, Figure 1 is a plan view of a cotton-compress constructed in accordance with this invention. Fig. 2 is a side elevation thereof. Fig. 3 is a central vertical longitudinal sectional view thereof. Fig. 4 is a detail transverse sectional view on the line 4 4 of Fig. 1. Fig. 5 is an enlarged detail elevation, partly in section, of one of the core-rods.

Referring to the accompanying drawings, the numeral 1 designates a substantially rectangular press-frame, within which is mounted for rotation a triplet of compressing-rolls, said triplet comprising a pair of spaced fixed rotating compressing-rolls 2, which may be termed the "positive" rolls of the press, and an intermediate movable rotating compressing-roll 3, arranged intermediate of the rolls 2, and alternately movable toward and away from each fixed roll 2 in the space between said fixed rolls, as clearly illustrated in the drawings.

The fixed rotating compressing-rolls 2 are spaced a sufficient distance apart to provide for the movement of the intermediate movable roll 3 and the formation of a complete cylindrical or roll bale, and said fixed rolls 2 have their shaft extremities 4 mounted in suitable bearings 5 in the opposite side of the press-frame 1. The shaft extremities 4 of the rolls 2 at one side of the press-frame have mounted thereon the gear-wheels 6, which mesh with an adjacent gear-pinion 7, mounted at one end of the transverse shafts 8, journaled transversely within the frame 1. The extremities of the shafts 8, opposite the gear-pinions 7, have loosely mounted thereon the sprocket-wheels 9, provided at one side with clutch-hubs 10, normally engaged by the clutch-collars 11, feathered on the shafts 8, and suitably controlled by levers 12, connected therewith, thereby completing simple and efficient means for stopping the rotation of either of the rolls 2 when a bale has been completed, or for starting the rotation of such roll when the formation of a new bale is commenced, as will be readily understood by those skilled in the art.

Arranged transversely within the frame 1, below one of the fixed rolls 2, is a counter-shaft 13, carrying at one end a chain-wheel 14, which communicates motion to a single endless drive-chain 15, which also passes over the sprocket-wheels 9, for both of the shafts 8, and thereby provides means for communicating motion to each of the rolls 2 when the clutch connection for said sprocket-wheels are in engagement. At the end opposite the chain-wheel 14 the counter-shaft 13 carries a spur-wheel 17, meshing with a gear-pinion 18 therebelow and mounted on one end of the drive-shaft 19. The shaft 19 is journaled transversely within the lower part of the frame 1, and has mounted thereon at an intermediate point a band-pulley 20, which receives the belt for communicating motion to the several parts of the press.

The intermediate movable compressing-roll 3, which may be termed the "negative" roll of the press, carries the shaft extremities 21, which project through and have a movement in the longitudinal guide-slots 22, formed in opposite sides of the press-frame 1, and one of said shaft extremities 21 has mounted thereon a sprocket-wheel 23, which sprocket-wheel is fast on the shaft extremity and is engaged by the drive-chain 15, whereby a positive rotation is imparted to the intermediate movable compressing-roll 3 at all times during the operation of the press. Both of the shaft extremities 21 of the roll 3, which project beyond the opposite sides of the frame 1, loosely turn in the bearing-collars 24, at the outer extremities of the connecting-rods 25, arranged at opposite sides of the press-frame and connected with the reciprocating piston-rods 26, which rods slide through the stuffing-boxes 27 at one end of the pressure-cylinders 28, and carry at their inner ends within such pressure-cylinders the pistons 29.

The pressure-cylinders 28 are designed to be filled with water, oil or other fluid to resist the tendency of the movable roll to jump away from the bale during its growth, and said cylinders are preferably mounted on the press-frame at one end thereof and respectively at opposite sides. Each pressure-cylinder supports on the upper side thereof a valve-chest 30, communicating with opposite ends of the cylinder and having working therein the opposite valve-plugs 31, which control the passage of the fluid to and from the opposite ends of the cylinders in the same manner as fully set forth in pending applications, Serial Nos. 575,496 and 576,215, respectively. The opposite valve-plugs 31, within the valve-chest 30 of each pressure-cylinder, are provided with upwardly-extending stems 32, having a connection, respectively, with opposite portions of the oscillating valve-lever 33, pivotally supported at a point between its ends, as at 34, above the valve-chest, and it will also be noted that the oscillating valve-lever and its connections with the valve-plugs and the operation in conjunction therewith is similar to that described in the two pending applications above referred to. In addition to these features, the present invention contemplates for use in connection with each oscillating valve-lever 33 a pair of sliding weights 35 and 36, respectively carried at the outer ends of the long and short adjusting-bars 37 and 38, pivotally connected at their other ends, as at 39, to an upright arm 40, carried by one of the connecting-rods 25, it being of course noted that each connecting-rod carries one of the arms 40 for controlling the sliding weights for the valve mechanism of one of the pressure-cylinders.

The sliding weights 35 and 36, for each oscillating valve-lever 33, are adapted to loosely embrace the upper side of said lever and have a sliding movement thereon at one side of its fulcrum or pivotal support.

The sliding weight 35, carried by the long adjusting-bar 37, has a movement on the outer portion of the lever at one side of its fulcrum, while the other weight, 36, has a movement on the inner portion of the valve-lever at the opposite side of its fulcrum or pivotal point, but it is to be observed that each of the said weights is employed in conjunction with only one of the positive fixed compressing-rolls 2, so therefore only one of said weights is in engagement with the valve-lever at one time. To provide for raising and lowering the weights 35 and 36 to engage and disengage the same with the valve-lever, suitably-arranged pull-wires 41 may be connected with each of the adjusting-bars 37 and 38, although any other suitable mechanical appliance would answer the same purpose. In conjunction with the oppositely-located pressure-cylinders and the valve mechanism thereof is employed a circulating-pipe 42, which connects with the opposite valve-chests 30, to provide for maintaining the same pressure in each cylinder, as will be obvious.

At the inner sides of each of the fixed rotating compressing-rolls 2 the frame 1 is provided in its opposite inner sides with the horizontal core-supporting slots 43, at the inner terminals of which slots are formed the vertically-disposed core clearance spaces or grooves 44, which allow the cores of the bales to readily drop from between the rolls at the proper time, and in connection with each pair of oppositely-disposed core-supporting slots 43 is employed a core-rod 45. One of the core-rods 45 is designed to be removably and replaceably arranged between each of the fixed rolls 2 and the intermediate movable roll 3. The core-rod 45 is tapered from end to end and is spirally grooved at its large end, as at 46, for a portion of its length, and the opposite ends of the rod are left rounded to form spindle extremities 47, on which extremities are fitted the disk-heads 48, which form guards for the ends of the bale which is formed around the core-rod. One of the spindle extremities 47 of the core-rod is partially threaded, as at 49, to removably receive thereon one of said disk-heads 50, in order that, by the removal of said detachable disk-head, the core-rod may be readily withdrawn or unscrewed from the completed bale. The core-rods 45 are inserted in place between each of the rolls 2 and the roll 3 by inserting the spindle extremities of such rods through the clearance spaces or grooves 44 into the slots 43, and it will be observed that when a bale has been completed and the intermediate movable roll 3 relieved therefrom, the spindle extremities of the core-rod carrying such bale will freely pass into the core clearance spaces or grooves 44, and allow the completed bale to be dropped from the press.

The bat of cotton is fed to either side of the intermediate movable roll 3 through a swinging feed-spout 50ª, pivotally swung between a pair of supporting-uprights 51 at opposite sides of the frame 1. An adjusting-rod 52 is pivotally connected at one end to the feed-spout 50 at a point above its pivot to provide for swinging said feed-spout to an inclined position, so as to dispose its lower end at either side of the intermediate movable roll 3, whereby the cotton delivered into the spout from the condenser will be evenly fed onto the core-rod between one of the fixed rolls 2 and the intermediate movable roll 3.

In starting the press the parts are so adjusted that the intermediate movable roll 3 is disposed directly adjacent to the inner side of one of the fixed rolls 2, and a core-rod 45 is inserted in place between these two rolls. As the bat of cotton is fed between the fixed roll and the directly adjacent movable roll the same will be tightly wrapped around the core-rod in the well-known manner, and will continue to wrap therearound to form the roll-bale which constantly increases in size as the movable roll separates away or recedes from the fixed roll in operation, it being noted that the other fixed roll 2 is not in operation at this stage. The accumulation of cotton on the core-rod gradually forces the intermediate movable roll 3 away from the fixed roll, but this movement of the movable roll is resisted with great pressure by the water or other liquid within the adjacent cylinder, so that the movable roll will exert an enormous pressure against the roll-bale being formed, so that the cotton will be compressed to the desired density.

During the operation of the press, when the movable roll 3 is working in a direction toward the pressure-cylinders, the sliding weights 35, on the outer portions of the valve-levers 33, are in use, and are constantly approaching the outer tip ends of said valve-levers to provide for increasing the resistance offered to the outlet of the liquid from the outer ends of the cylinders in the same manner as set forth in the pending applications hereinbefore referred to, but when a bale has been completed between the fixed roll farthest from the cylinders and the movable roll, the weights 35 are lifted from the valve-lever 33 and the weights 36 dropped thereon to provide for regulating the pressure as the next bale is being formed between the fixed roll nearest the cylinders and the movable roll, as will be readily understood by those skilled in the art.

The construction herein described provides ample space for the discharge of a finished bail from the press, and when a completed bale has been thus discharged or dropped from the press, the removal disk-head 48 of the core-rod within such bale is detached so that the core-rod can be readily withdrawn by unscrewing the spirally-grooved portion 46, and then by a direct pull on the tapered rod.

Changes in the form, proportion and the minor details of construction may be resorted to without departing from the principle or sacrificing any of the advantages of this invention.

Having thus described the invention, what is claimed as new, and desired to be secured by Letters Patent, is—

1. In a cotton-compress, a pair of spaced fixed rotating compressing-rolls, an intermediate movable rotating compressing-roll working between the fixed rolls and alternately movable toward and away from each of said fixed rolls, and core-rods, substantially as set forth.

2. In a cotton-compress, a triplet of compressing-rolls comprising a pair of spaced fixed rotating compressing-rolls and an intermediate movable rotating compressing-roll, pressure mechanism connected with the movable roll, and core-rods, substantially as set forth.

3. In a cotton-compress, a triplet of compressing-rolls comprising a pair of spaced fixed rotating rolls and an intermediate movable roll working between the fixed rolls, fluid-pressure mechanism having piston-rod connections with the shaft extremities of the movable roll, and a core-rod adapted to be supported at each side of the movable roll, substantially as set forth.

4. In a cotton-compress, the frame, a triplet of compressing-rolls comprising a pair of spaced fixed rotating rolls and an intermediate movable roll alternately movable toward and away from each of said fixed rolls, a pair of pressure-cylinders provided with valve mechanism having an oscillating valve-controlling lever, the pistons working within the cylinders and having rod connections with the shaft extremities of the movable roll, an upright arm carried by the rod connection with each piston, a pair of different-length adjusting-bars pivotally connected at one end to each of said upright arms and carrying at their other ends sliding weights respectively adapted to slide on said valve-levers at opposite sides of its fulcrum or pivotal support, means for raising and lowering each weight, and a core-rod adapted to be supported at the inner side of each fixed roll, substantially as set forth.

In testimony that I claim the foregoing as my own I have hereto affixed my signature in the presence of two witnesses.

THOMAS J. GRIFFIN.

Witnesses:
 THOS. EVANS,
 WM. SELKIRK.